United States Patent [19]

Winters

[11] Patent Number: 4,592,919
[45] Date of Patent: Jun. 3, 1986

[54] SOUFFLE COMPOSITIONS

[75] Inventor: William C. Winters, Bloomington, Minn.

[73] Assignee: Sandoz, Inc., E. Hanover, N.J.

[21] Appl. No.: 687,525

[22] Filed: Dec. 28, 1984

[51] Int. Cl.$^4$ .................. A23L 1/187; A23L 1/32
[52] U.S. Cl. .................. 426/568; 426/578; 426/658
[58] Field of Search .............. 426/568, 578, 564, 658

[56] References Cited

U.S. PATENT DOCUMENTS

| | | | |
|---|---|---|---|
| 2,939,792 | 6/1960 | Kline | 426/564 |
| 3,043,700 | 7/1962 | Szczesniak | 426/568 |
| 3,655,405 | 4/1972 | Karas et al. | 426/568 |
| 3,917,873 | 11/1975 | Kuroda et al. | 426/568 |
| 4,395,429 | 7/1983 | Campagne et al. | 426/564 |
| 4,428,971 | 1/1984 | Havette | 426/568 |

*Primary Examiner*—Jeanette Hunter
*Attorney, Agent, or Firm*—Gerald D. Sharkin; Robert S. Honor; Walter F. Jewell

[57] ABSTRACT

Dry souffle compositions having malto/Dextrin and Zanthan gum and wherein the resulting soufflees have an improved foam structure.

5 Claims, No Drawings

SOUFFLE COMPOSITIONS

The invention relates to souffle compositions. In one particular aspect it relates to instant souffle compositions.

Prior art souffle compositions (under food service conditions) have been unable to hold up for an extended length of time after baking, without collapse of the foam structure. The prior art souffle compositions must be served directly after baking to avoid collapse of the foam structure during cooling. The souffle compositions of this invention provide foam structures that hold up for an extended length of time under food service conditions.

The souffle compositions of this invention may be dry mixes to which water or skim milk and flavoring ingredients may be added. The souffle dry mixes may have the following compositions

|  | Percent |
| --- | --- |
| Egg White Solids (1) | 20–40 |
| Powdered Vegetable Shortening (2) | 25–50 |
| Modified Food Starch (3) | 8–12 |
| Malto/Dextrin (4) | 5–15 |
| Dextrose | 0–15 |
| Sucrose | 0–15 |
| Salt | 0–3 |
| Lactic Acid Powder | 0–3 |
| Potassium Bitartrate | 0.5–2.5 |
| Xanthan Gum (5) | 0.5–1.0 |

The souffle dry mixes may have the following preferred compositions

|  | Percent |
| --- | --- |
| Egg White Solids | 25–35 |
| Powdered Vegetable Shortening | 25–45 |
| Modified Food Starch | 9–11 |
| Malto/Dextrin | 8–12 |
| Dextrose | 0–10 |
| Sucrose | 0–10 |
| Salt | 2.75 |
| Lactic Acid Powder | 0–2.5 |
| Potassium Bitartrate | 0.5–2.0 |
| Xanthan Gum | 0.6–0.9 |

The souffle dry mixes may have the following most preferred compositions.

|  | Percent |
| --- | --- |
| Egg White Solids | 24.14–33.60 |
| Powdered Vegetable Shortening | 29.29–44.26 |
| Modified Food Starch | 10.46–10.61 |
| Malto/Dextrin | 9.61–9.72 |
| Dextrose | 0–9.24 |
| Sucrose | 0–9.61 |
| Salt | 0–2.64 |
| Lactic Acid Powder | 0–2.43 |
| Potassium Bitartrate | 0.85–1.57 |
| Xanthan Gum | 0.79–0.82 |

(1) Spray dried egg white solids
  Henningsen Foods, Inc.
  Omaha, NE
(2) Sanna, Inc., Nesper, WI
  NDX-112V
  Partially Hydrogenated Soy Oil,
  Lactose, Sodium Caseinate,
  Dipotassium Phosphate, Sodium
  Silicoaluminate
(3) National Starches N-50B
(4) Corn syrup Solids, Grain Processing Corp.
(5) High Mol.WT Natural Polysaccharide from Xanthomonas Compestris, Kelco Div. of Merck & Co.

A souffle preparation may be prepared from the base souffle dry mixes of this invention as follows;
(1) Souffle base mix is combined with fluid skim milk and whipped until soft peaks form.
(2) Flavoring ingredients are blended into the base mix-milk mixture.
(3) The mixture is portioned into containers and baked.

Souffle's may be prepared using the souffle dry mix composition of this invention in conventional or convection ovens, or a water bath. Oven temperatures may be about 350° F. for a conventional oven, and about 300° F. for a convection oven. Oven times may be from about 25–70 minutes for a conventional oven, and from about 20–50 minutes for a convection oven, depending on pan or dish size used. Additional times of 10–20 minutes may be added for bake time in water baths.

Various flavoring agents may be used with the souffle dry mix compositions of this invention. Entree flavoring agents may include, for example, cheese, spinach, chicken or tuna. Dessert flavoring agents may include, for example, chocolate, strawberry, orange or raspberry.

EXAMPLES 1–6

In these examples various entree and dessert souffles are prepared as follows;

| | PERCENT MATERIALS | | | | | |
| --- | --- | --- | --- | --- | --- | --- |
| | 1 ENTREE MIX | 2 DESSERT MIX | 3 CHEESE SOUF | 4 SPIN SOUF | 5 CHOC SOUF | 6 STRAW SOUF |
| Fluid Skim Milk | — | — | 64.92 | 48.20 | 58.15 | 47.42 |
| Egg White Solids | 33.68 | 24.14 | 6.72 | 5.81 | 4.65 | 3.79 |
| Powdered Veg Short. | 29.29 | 44.26 | 5.87 | 4.36 | 8.52 | 6.96 |
| Mod. Food Starch | 10.61 | 10.46 | 2.13 | 1.58 | 2.01 | 1.64 |
| Malto/Dextrin | 9.72 | 9.61 | 1.95 | 1.45 | 1.85 | 1.51 |
| Dextrose | 9.24 | — | 1.85 | 1.38 | — | — |
| Salt | 2.64 | — | 0.53 | 0.39 | — | — |
| Lactic Acid Powder | 2.43 | — | 0.49 | 0.36 | — | — |
| Potassium Bitartrate | 1.57 | 0.85 | 0.32 | 0.23 | 0.16 | 0.13 |
| Xanthan Gum | 0.82 | 0.79 | 0.16 | 0.12 | 0.15 | 0.12 |
| Color, Reel Egg Shade | 0.08 | — | 0.02 | 0.01 | — | — |
| Sucrose | — | 9.61 | — | — | 1.85 | 1.51 |
| Vanillin | — | 0.28 | — | — | 0.05 | 0.04 |
| SUB TOTAL | 100.00 | 100.00 | 20.04 | 14.89 | 19.24 | 15.70 |

-continued

PERCENT MATERIALS

| | | | | |
|---|---|---|---|---|
| *Sharp Cheddar Cheese | 15.04 | — | — | — |
| *Spinach (Frozen) | — | 22.33 | — | — |
| *Swiss Cheese | — | 11.17 | — | — |
| *Onion | — | 2.75 | — | — |
| *Parmesan Cheese | — | 0.66 | — | — |
| *Cocoa | — | — | 4.33 | — |
| *Sugar | — | — | 18.28 | 5.49 |
| *Strawberries (Frozen) | — | — | — | 31.39 |
| TOTAL | 100.00 | 100.00 | 100.00 | 100.00 |

*flavoring ingredients

1. Pour skim milk into bowl. Add Souffle Mix. Mix at medium speed with wire whip for one minute. Scrape sides and bottom of bowl. Beat at high speed until soft peaks form.
2. Add flavoring ingredients. Beat at high speed until blended.
3. Evenly distribute batter into well greased steam table pans or souffle dishes.
4. Bake as follows. Souffle may rise approximately 4 inches above pan or dish during baking. Volume will reduce slightly during cooling.

| Oven Type/Temperature | 12 × 10 × 2" Pan | 12 × 20 × 2" Pan | 8 Oz Souffle Dish |
|---|---|---|---|
| Conventional @ 350° F. | 45–55 min. | 60–70 min. | 20–30 min. |
| Conventional @ 300° F. | 30–40 min. | 40–50 min. | 20–30 min. |

Examples 1 and 2 are base souffle dry mix compositions prior to the addition of milk and flavoring ingredients.

What is claimed is:

1. A souffle dry mix composition comprising,

| | |
|---|---|
| Egg White Solids | 20–40% |
| Powdered Vegetable Shortening | 25–50% |
| Modified Food Starch | 8–12% |
| Malto/Dextrin | 5–15% |
| Dextrose | 0–15% |
| Sucrose | 0–15% |
| Salt | 0–3% |
| Lactic Acid Powder | 0–3% |
| Potassium Bitartrate | 0.5–2.5%, and |
| Xanthan Gum | 0.5–1.0%. |

2. The souffle dry mix composition of claim 1 comprising,

| | |
|---|---|
| Egg White Solids | 25–35% |
| Powdered Vegetable Shortening | 25–45% |
| Modified Food Starch | 9–11% |
| Malto/Dextrin | 8–12% |
| Dextrose | 0–10% |
| Sucrose | 0–10% |
| Salt | 0–2.75% |
| Lactic Acid Powder | 0–2.5% |
| Potassium Bitartrate | 0.5–2.0%, and |
| Xanthan Gum | 0.6–0.9%. |

3. The souffle dry mix composition of claim 2 comprising,

| | |
|---|---|
| Egg White Solids | 24.14–33.60% |
| Powdered Vegetable Shortening | 29.29–44.26% |
| Modified Food Starch | 10.46–10.61% |
| Malto/Dextrin | 9.61–9.72% |
| Dextrose | 0–9.24% |
| Sucrose | 0–9.61% |
| Salt | 0–2.64% |
| Lactic Acid Powder | 0–2.43% |
| Potassium Bitartrate | 0.85–1.57%, and |
| Xanthan Gum | 0.79–0.82%. |

4. A souffle product comprising, a dry mix composition of claim 1, skim milk and flavoring ingredients.

5. A method of preparing a souffle product comprising,
    (1) combining a souffle dry mix of claim 1 with skim milk and whipping the mixture until soft peaks of souffle foam form,
    (2) blending flavoring ingredients into the blend of step 1, and
    (3) portioning the mixture of step 2 into containers and baking to form the souffle.

* * * * *